United States Patent [19]
Fisher

[11] 3,757,908
[45] Sept. 11, 1973

[54] MECHANICAL LATCH ASSEMBLY FOR BRAKE SYSTEM

[76] Inventor: Delbert P. Fisher, 17094 Dunblaine, Birmingham, Mich. 48009

[22] Filed: Jan. 19, 1972

[21] Appl. No.: 221,466

Related U.S. Application Data

[63] Continuation of Ser. No. 884,866, Dec. 15, 1969, abandoned.

[52] U.S. Cl.................... 188/265, 74/535, 192/114
[51] Int. Cl............................................. F16d 63/00
[58] Field of Search..................... 188/265; 192/114; 74/533, 535, 539

[56] References Cited
UNITED STATES PATENTS

| | | | |
|---|---|---|---|
| 2,161,640 | 6/1939 | Schnell | 188/327 |
| 2,940,334 | 6/1960 | Koskela | 24/533 X |
| 2,961,073 | 11/1960 | Legge et al. | 188/265 X |

Primary Examiner—George E. A. Halvosa
Attorney—Thomas N. Young

[57] ABSTRACT

An auxiliary brake system including a ratchet mounted on a brake shoe, a lever pivotally mounted on the ratchet and carrying a pawl, hydraulic pressure responsive means for pivoting the lever to an applied position whereby the pawl and ratchet latch. Release is effected by means of a resilient or nonresilient release member which assumes a cocked position relative to the pawl after the lever is applied, thus, to respond to the next stroke to disengage the pawl from the ratchet.

13 Claims, 6 Drawing Figures

PATENTED SEP 11 1973 3,757,908

INVENTOR.
Delbert P. Fisher
BY
Barnard, McGlynn & Reising
ATTORNEYS

INVENTOR.
Delbert P. Fisher
BY
Barnard, McGlynn & Reising
ATTORNEYS

MECHANICAL LATCH ASSEMBLY FOR BRAKE SYSTEM

This is a continuation of application Ser. No. 884,866 filed Dec. 15, 1969, now abandoned.

This invention relates to brake systems of a type which may be used as an auxiliary brake on vehicles and more particularly to a brake system having a latch assembly which is located at the brake unit for latching a brake actuator lever in an applied position.

Vehicular auxiliary brake assemblies are almost universally mechanical in nature and include a cable which extends from an actuator to the brake unit and a latch, generally of a mechanical nature, at the actuator to hold the brake in the applied condition. Such mechanical cable operator assemblies are subject to various problems and tendencies toward failure due to deterioration of the mechanical cable and the associated components.

Accordingly, fluid operated auxiliary brake systems have been proposed. One type of latch mechanism which has been proposed for use in a fluid operated auxiliary brake system involves trapping pressure in the operating line to maintain the brakes in the applied condition. This is generally unsatisfactory since a leak of fluid from the line eventually causes the brake to be released. Another prior art device involves a mechanical latch mechanism which automatically locks the brake cylinder plunger in the brake applied condition but which requires a mechanical link such as a wire between the mechanical latch and the operator position so that the operator may release the mechanical latch to release the brakes. This is also generally unsatisfactory since the release mechanism is of a mechanical nature and is, therefore, subject to nearly the same deterioration and operating problems as an overall mechanical assembly.

The present invention provides an auxiliary brake system which is preferably fluid operated and which includes a mechanical latch mechanism located at the wheel brake unit and responsive to brake application to latch in a brake applied condition and to be maintained in this condition even though pressure is relaxed in the fluid operating line. The invention further includes a release mechanism which is mechanical in nature but which responds to an hydraulic link between the brake unit and the operator position. In general, this is accomplished by means of an auxiliary brake system which comprises a fluid brake unit having an actuator lever displaceable between brake applied and brake released positions, fluid pressure responsive means for displacing the lever to the brake applied position, latch means including a portion carried by the lever and coacting with a fixed member in the brake unit for automatically latching the lever in the brake applied position and maintaining the lever in that position after the release of pressure in the operating line.

In accordance with a preferred feature of the invention, the applied brake is released upon a second actuation of the fluid operating means such that the brake may be applied and released by successive strokes of an operator device. In general, this is accomplished by means of a latch and release mechanism which includes a member capable of assuming a cocked position after the first stroke whereby on the second stroke the member releases the mechanical latch and at the completion of the second stroke resumes an uncocked position which permits the brake to be reapplied upon the next operator stroke.

In a preferred form, the invention is embodied in a brake assembly having a fixed ratchet member in the brake unit and a pivotal pawl carried by the brake actuator lever and engageable with the ratchet member to latch the actuator in a brake applied position. The preferred embodiment further includes an input member having a lost motion connection to the actuator lever and carrying a release member which alternates between cocked and uncocked position during successive strokes or displacements of the input member such that in the uncocked position the actuator lever is displaced to the applied position and automatically latched, and in the cocked position the operation of the input means or displacement of the input member causes the release member to engage the pawl to release it from engagement from the ratchet member. The embodiment of the invention preferably but not necessarily includes a resilient connection between the release member and the pawl such that the pressure causing engagement between the pawl and the ratchet is relieved as the lost motion connection between the input member and the actuator lever is taken up, after which the resilient release apparatus causes pivotal displacement of the pawl to release the brake mechanism and permit the actuator lever to return to the brake release position.

The various features and advantages of the subject invention will be best understood from a reading of the following specification which describes two illustrative embodiments of the invention. This specification is to be taken with the accompanying FIGURES of which:

Figure 1:
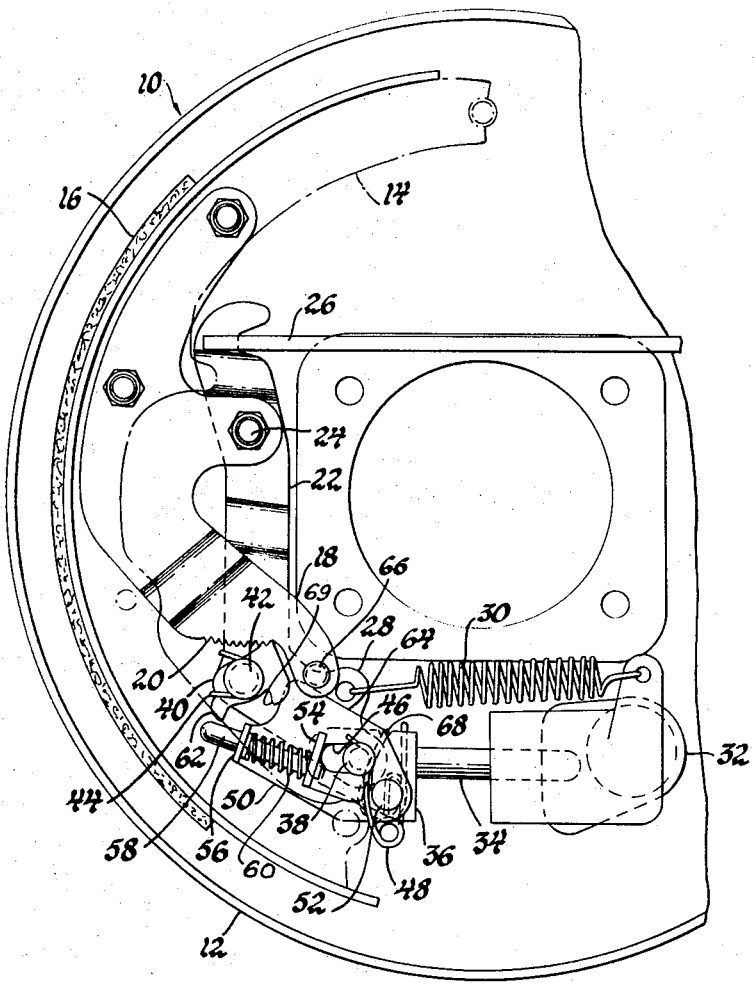
FIG. 1 is a plan view of a wheel brake unit embodying the invention.

Referring to FIG. 1, the first illustrative embodiment of the invention is shown in the form of an auxiliary operating system for a conventional hydraulic vehicular wheel brake assembly 10 comprising a rotatable drum 12 and a pivotal brake shoe 14 having an arcuate lining 16 engageable with the brake drum when outwardly displaced by a conventional wheel cylinder, not shown. Mounted on the brake shoe 14 is a stamped steel ratchet member 18 in the form of a rigid plate having a plurality of ratchet teeth 20 formed along a portion of the periphery thereof. A brake actuator lever 22 is pivotally connected to the ratchet member 18 by means of a pivotal connection 24 so as to be pivotally displaceable between a brake applied and a brake released position. The upper end of the lever 22 is in engagement with the forked end of a push rod 26 which extends across unit 10 to displace the opposite shoe (not shown) and the lower end of the lever 22 is provided with a rounded portion 28 having an aperture which receives one end of a return spring 30. The other end of the spring 30 is connected to an auxiliary wheel cylinder 32 which responds to hydraulic pressure in an auxiliary brake line (not shown) to urge a rod 34 and a clevis 36 against a pin 38 on the lower end of lever 22. This pivots the lever 22 in the clockwise direction as viewed in FIG. 1 toward the brake applied position.

To latch the lever 22 in the brake applied position, a pawl 40 is mounted on the lever 22 by means of a pivotal connection 42 and biased by a torsion spring 44 into engagement with the teeth 20 of the ratchet member 18. Accordingly, when the lever 22 is rotated in the clockwise direction by clevis 36, the pawl 40 is ratcheted over the teeth 20 from right to left as shown in FIG. 1 and upon relaxation of the force tending to pivot lever 22, latches the lever in the rotated position by engagement with the teeth 20.

As shown in FIG. 1, clevis 36 includes an elongated aperture 46 which receives and coacts with the pin 38 on the lever 22 to form a lost motion connection between the clevis and the lever 22. A bias spring 48 exerts a spring force between the pin 38 and the clevis 36 to urge the clevis toward the wheel cylinder 32 relative to the pin 38 as far as permitted by the slot 46. Accordingly, when the cylinder 32 is operated in response to applied fluid pressure, the push rod 34 is displaced to the left as seen in FIG. 1 compressing the spring 48 and urging the lever 22 in the clockwise direction by mechanical pressure exerted on the pin 38. The pawl 40 latches the lever 22 in the brake applied position reached by clockwise rotation of the lever 22 after which the clevis 36 and push rod 34 are permitted to return in the right hand direction to the extent of the horizontal dimension of the elongated slot 46. Obviously, urging the lever 22 clockwise causes the upper end of the lever to react against the rod 26 and to outwardly displace shoe 14 and the opposite shoe (not shown).

Figure 4:
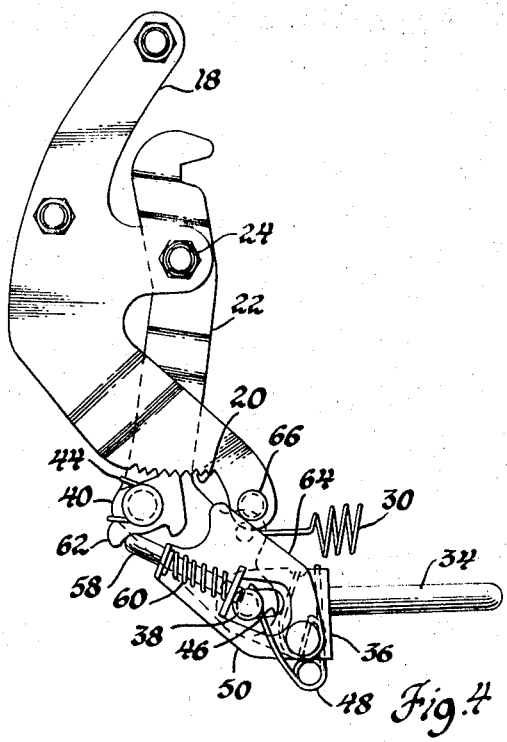
FIG. 4 is a partial plan view of the apparatus of FIG. 1 in a further advanced operating condition.

To release the lever 22 once it has been rotated to the brake applied position and latched by interaction between pawl 40 and ratchet 18, the brake assembly 10 further includes a release member 50 which is carried by the clevis 36 and pivotally connected thereto by means of a pin connection 52. The release member 50 is a stamping or of such other construction as to permit having turned up flanges 54 and 56 which receive and support a plunger 58 having a compressible helical support spring 60 which provides for the resilient compression of plunger 58 into the flanges 54 and 56; i.e., displacement to the right as seen in FIG. 1 against the bias of spring 60. Plunger 58 is adapted to engage and coact with a radially depending finger 62 on pawl 40 after the first operating stroke of the push rod 34 places the latch release member in a cocked position as represented by FIG. 4. In the uncocked position and with unit 10 in the brake released condition, which is seen in FIG. 1, the upper peripheral edge 64 of the release member 50 abuts a stop pin 66 which is secured to a lower portion of the ratchet member 18 to force disengagement of plunger 58 from the radially depending finger 62 on pawl 40 as unit 10 approaches the brake released condition of FIG. 1. The release member 50 is urged in the clockwise direction as seen in FIG. 1 by a spring 68 which extends from the pin connection 52 to the upper edge of the sliding clevis 36 as best shown in FIG. 1. Accordingly, the release member 50 is shown in FIG. 1 to be disposed in the clockwise most position as determined and limited by the mechanical interaction between the peripheral edge 64 and the stop pin 66 with unit 10 in the brake released condition.

Figure 2:
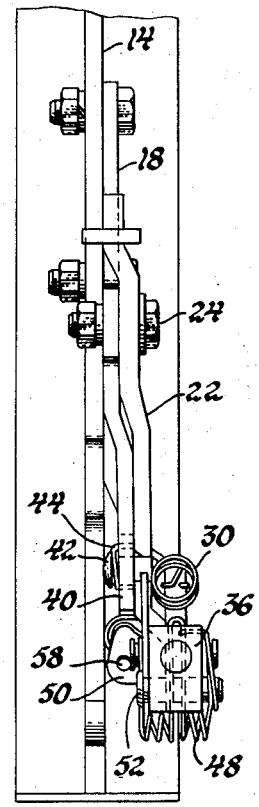
FIG. 2 is an end view of the embodiment of FIG. 1.

The operation of the first illustrative embodiment of the invention will now be described with reference to FIGS. 1 through 5. In FIGS. 1 and 2 the brake apparatus is shown in the brake released condition with no fluid pressure being applied to the auxiliary wheel cylinder 32 through the auxiliary brake line. In this condition, the lever arm 22 is disposed in the counterclockwise most position with the pawl 40 engaging the right hand most teeth 20 of the ratchet member 18. In this condition the brake shoe 14 is spaced from the drum 12. In addition, the clevis 36 and push rod 34 are disposed in their right-handmost position and the release member 50 is in the uncocked position wherein the upper peripheral edge 64 abuts the stop pin 66 on the ratchet member 18 and the plunger 58 is radially clear of the depending finger 62 of pawl 40.

Figure 3:
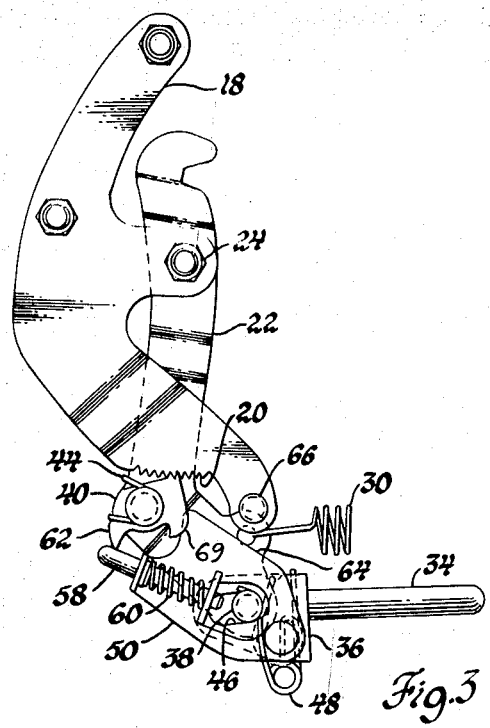
FIG. 3 is a partial plan view of the apparatus of FIG. 1 in a second stage of operation.

To apply the auxiliary brake assembly 10, the operator operates the usual auxiliary brake pedal or handle to pressurize an hydraulic brake line thereby operating the pressure-responsive cylinder 32 and urging the push rod 34 and the clevis 36 to the left as shown in FIGS. 1 and 3. Displacement of the clevis 36 to the left, as shown in FIG. 3, causes the right-hand side of slot 46 to come up against the pin 38 and urge the lever arm 22 in the clockwise direction relative to the ratchet member 18. Accordingly, pawl 40 ratchets over the teeth 20 to the extent permitted by the clearance between the lining 16 and the drum 12. As shown in FIG. 3, the pawl 40 is displaced along with the actuator lever 22 to some point approximately half way along the series of teeth 20. FIG. 3 shows the lever 22 in the brake applied position with fluid pressure still operating the cylinder 32 to urge the clevis 36 to the left through the push rod 34. Accordingly, pin 38 is disposed fully to the right in the elongated slot 46.

Going on to FIG. 4, this FIGURE illustrates the assembly 10 in the brake applied condition but with actuating fluid pressure being relaxed to permit the clevis 36 to be displaced back to the right relative to the actuator lever 22. Accordingly, the pin 38 abuts the left hand edge of the elongated slot 46 in the clevis 36 and is biased toward this position by the hairpin compression spring 48. As also shown in FIG. 4, the relative displacement between the clevis 36 and the lever 22 permits the plunger 58 carried by the release member 50 to slide over the depending finger 62 of the pawl 40 until the finger clears the end of the plunger. At this point the bias spring 68 rotates the release member 50 in the clockwise direction to the extent of bringing the left hand end of plunger 58 into contact with the peripheral edge of pawl 40 adjacent depending finger 62. Accordingly, the release member 50 is permitted to assume a cocked position relative to the pawl 40 wherein the plunger 58 falls in behind the depending finger 62. In this position, the plunger is now ready to operatively engage the finger 62 upon the next operating stroke of the push rod 34 and the clevis 36.

Figure 5:
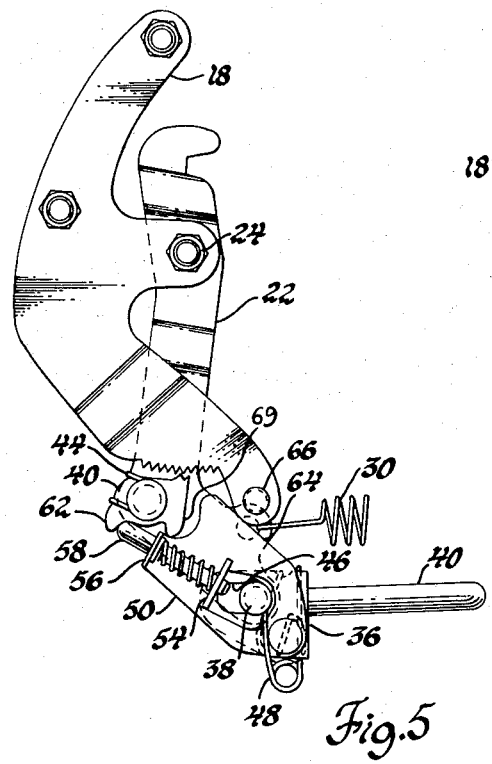
FIG. 5 is still another partial plan view of the FIG. 1 embodiment in a further advance operating condition; and, FIG. 6 is a partial plan view of a second embodiment of the invention in a brake released condition.

Looking to FIG. 5, the disposition of the apparatus is shown after the brake pressure has been reapplied to the cylinder 32 to urge the clevis 36 and push rod 34 to the left for the second time. The initial left hand displacement of the clevis 36 relative to the pin 38 on lever 22 takes up the lost motion connection provided by the elongated slot 46. During this displacement, the plunger 58 is compressed into the flanges 54 and 56 of the release member 50 against the bias of spring 60. As the lost motion connection is taken up and force is now exerted directly on the pin 38 by the clevis 36, the pressure tending to maintain the teeth of the pawl 40 in engagement with the teeth 20 of the ratchet member 18 is relaxed and the force tending to urge plunger 58 to the left produced by compression spring 60 overcomes the torsional force exterted on the pawl 40 by the spring 44 and disengages the pawl 40 from the teeth 20 of ratchet member 18 as shown in FIG. 5. During this interaction, counterclockwise rotation of pawl 40 is limited by the engagement of the peripheral extension 69 of pawl 40 with flange 56 of release member 50.

As the input brake pressure applied to the cylinder 32 is relaxed, the clevis 36 and push rod 34 are permitted to retract to the right as seen in FIG. 5 and the return spring 30 pulls the lever arm 22 in the counterclockwise direction until the lever 22 again reaches the brake released position of FIG. 1. Plunger 58 continues to engage the depending finger 62 of pawl 40 to maintain the teeth of the pawl out of engagement with the teeth 20 of the ratchet member 18 until the lever arm 22 and clevis 36 have displaced far enough to the right as seen in FIG. 5 to permit the upper peripheral edge 64 of the release member 50 to again engage the pin 66 on the ratchet member 18. At this point the pawl 40 rotates slightly in the clockwise direction to permit the finger 62 to slide over the rounded end of the plunger 58. Once this has been accomplished, the torsion spring 44 snaps the pawl 40 in the counterclockwise position to assume the position shown in FIG. 1 and to uncock the release member 50. Accordingly, the next stroke of the push rod 34 and clevis 36 will permit the pawl 40 to lock up with the teeth 20 of the ratchet member 18 to latch the brake apparatus in the brake applied position as previously described.

Figure 6:
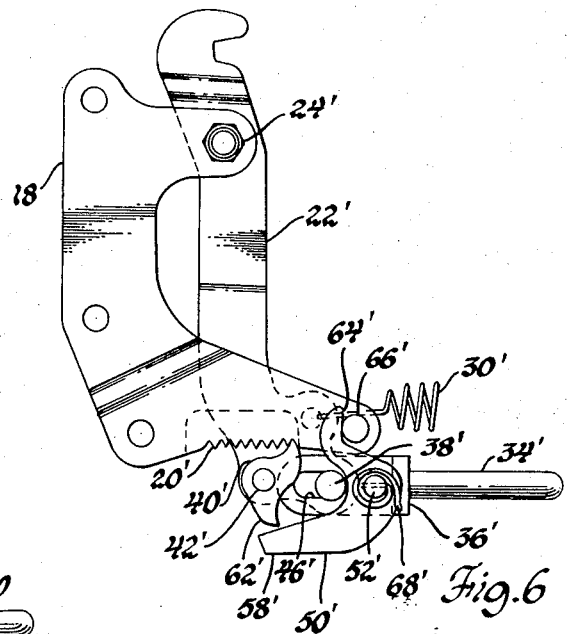

FIG. 6 illustrates a second embodiment of the invention which differs from the embodiment of FIGS. 1 through 5 principally in the absence of a resilient release apparatus to first relieve the engagement pressure between the pawl and ratchet before attempting to rotate the pawl out of engagement with the ratchet.

Looking more specifically to FIG. 6, the assembly is shown to comprise a ratchet plate 18' having teeth 20' disposed along a peripheral edge thereof. A brake actuator lever 22' is pivotally connected to the ratchet member 18' by means of the pivotal connection 24'. Lever 22' carries a pawl 40' which is pivotally connected thereto at a pivot point 42' and engaging the teeth 20' to latch the lever 22' in a brake applied position relative to the ratchet member 18'. A spring 30' biases the lever 22' to a brake released position wherein the lever 22' is rotated in a counterclockwise direction to a maximum degree.

To apply the brake through the apparatus of FIG. 6, a sliding clevis 36' is operated by a push rod 34' in response to fluid brake pressure being applied to a wheel cylinder of the type shown in FIG. 1. Such pressure urges the clevis 36' to the left as shown in FIG. 6 such that an elongated slot 46' engages a pin 38' on the lever 22' to urge the lever in the clockwise direction. After the lever 22' reaches the brake applied position the pawl 40' engages the teeth 20' of the ratchet member 18' to prevent release of the lever 22' until the next stroke of the push rod 34'.

Clevis 36' carries a release member 50' which is pivotally connected thereto by means of a pin connection 52'. Release member 50' includes an elongated radial extension 58' which coacts with a depending finger 62' of the pawl 40' when in a cocked position to effect a release operation. Release member 50' further includes an angulated extending finger 64' which normally abuts against a pin 66' carried on a lower extension of the ratchet member 18'. Release member 50' is provided with a suitable spring to bias the member for rotation in the clockwise direction, this rotation being limited by the interaction between the finger 64' and the pin 66' of the ratchet member 18'.

In operation, the embodiment of FIG. 6 is subject to a first input stroke wherein the clevis 36' and the push rod 34' are displaced to the left as shown in FIG. 6. During such displacement, the release member 50' is in the position shown such that the extension 58' clears the finger 62' of the pawl 40' and no interaction or operative connection occurs therebetween. Accordingly, the brake actuator lever 22' is simply rotated in the clockwise direction moving the pawl 40' over the teeth 20' from right to left as shown in FIG. 6 until the lever 22' reaches the brake applied position determined by the clearance between the actual brake friction surfaces. Once the lever 22' reaches the brake applied position, the pawl 40' engages the teeth 20' of the ratchet member 18' to prevent release of the brake until the next stroke of the push rod 42'.

With the clevis 36' displaced to the right from th position represented in FIG. 6, the torsion spring 68' rotates the release member 50' in the clockwise direction bringing the extension 58' up behind the finger 62' of the pawl 40', thus, placing the release member 50' in the cocked position. Accordingly, on the next stroke of the clevis 36' and the push rod 34' the extension 58' of the release member 50' directly and operatively engages the finger 62' of the pawl 40' tending to rotate the pawl in the clockwise direction out of engagement with the teeth 20' of the ratchet member 18'. A second stroke of the push rod 34' thus, completely disengages the pawl 40' from the ratchet member 18' and permits the entire arrangement including the lever 22', the clevis 36', and the push rod 34' to be relaxed from left to right, thus, moving the lever 22' to the brake released position. As the lever 22' reaches the brake released position, the lost motion connection provided by the elongated slot 46' of the clevis 36' and the pin 38' of the lever 22' causes the finger 64' of the release member 50' to engage the stop pin 66' of the ratchet member 18' before the clevis 36' reaches the fully relaxed position. As soon as such engagement occurs the release member 50' is rotated in a counterclockwise direction, thus, causing the extension 58' to fall out from behind the finger 62' of the pawl 40' and to assume the uncocked position shown in FIG. 6. In this condition, the next stroke of the push rod 34' is operative to apply and latch the brake assembly as previously described.

It is to be understood that the embodiments of the invention described above are purely illustrative and are not to be construed in a limiting sense. It will be apparent to those skilled in the art that various modifications of the embodiments shown are possible. Moreover, the invention has been described as an auxiliary brake system for vehicles which may be used either as a secondary or emergency brake system or as a parking brake system as may be the particular case. In addition, however, it is equally feasible to employ the subject invention as the sole brake system in a vehicular or nonve- The embodiments of the invention in which an exclusive property or privilege is claimed are defined as follows:

1. A fluid operated auxiliary brake system comprising: a wheel brake drum; a brake shoe disposed within the drum and movable into frictional engagement with the drum; a ratchet member secured to the shoe and having a ratchet portion, an actuating lever pivotally carried by the ratchet member; a pawl pivotally carried by the lever and engageable with the ratchet portion; fluid pressure responsive actuator means for pivoting the actuating lever relative to the ratchet member on a first application of fluid pressure thereby to set the brake; bias means urging the pawl into engagement with the ratchet portion to lock the lever upon release of pressure from the first application thereof; a release member operated by the actuator means for assuming a cocked position engaging the pawl upon said first application of fluid pressure whereby upon a second application of fluid pressure the pawl is disengaged from the ratchet portion to release the brake.

2. A brake system as defined in claim 1 wherein the release member includes a clevis having a lost-motion connection to the actuating lever, and an element engageable with the pawl when in the cocked position.

3. A brake system as defined in claim 2 wherein the ratchet member includes a portion in engagement with said element to place said element in the cocked position when the first fluid pressure application causes relative movement between the lever and ratchet member.

4. A mechanical latch assembly for fluid operated vehicular brakes comprising in combination: a wheel brake unit, a brake support disposed within the wheel brake unit and carrying a friction surface for braking purposes, a ratchet member mounted on the support, a brake actuator lever pivotal relative to the ratchet member between brake applied and brake released positions, a pawl carried by the actuator lever and engageable with the ratchet member to latch the actuator lever in the brake applied position, fluid operated input means for pivoting the lever, and release means to disengage the pawl from the ratchet member.

5. An assembly as defined in claim 4 wherein the input means includes an input member connected to the actuator lever and being displaceable through cyclically repeatable brake applying and brake releasing strokes.

6. An assembly as defined in claim 5 wherein the release means is carried by the input member.

7. Apparatus as defined in claim 5 including means for biasing the actuator lever to a brake released position.

8. An assembly as defined in claim 6 wherein the input member is connected to the actuator lever by a lost motion connection operable in the direction of said strokes.

9. An assembly as defined in claim 8 wherein the release means includes a resilient portion operatively engaging the pawl to disengage the pawl from the ratchet member during a brake releasing stroke after the lost motion between the input member and actuator lever is taken up.

10. An assembly as defined in claim 9 wherein the resilient portion includes a spring biased plunger operatively engaging the pawl when in a cocked position.

11. An assembly as defined in claim 8 wherein the releasing means includes a release member pivotally mounted on the input member and cocking means responsive to a brake applying stroke for pivoting the release member into a cocked position operatively engaging the pawl such that a brake releasing stroke causes the member to disengage the pawl from the ratchet member.

12. An assembly as defined in claim 11 wherein the pawl is pivotally mounted on the actuator lever and includes a depending portion, said release member including an extended portion operatively engaging the depending portion of the pawl when in the cocked position, the cocking means including a spring for rotating the release member into the cocked position.

13. An assembly as defined in claim 12 including stop means on the ratchet member engageable by the release member to pivot the release member to an uncocked position wherein the extended portion is operatively disengaged from the depending portion of the pawl during travel of the input member and actuating lever to the brake released position.

* * * * *